(12) United States Patent
Joshi et al.

(10) Patent No.: US 7,065,129 B2
(45) Date of Patent: Jun. 20, 2006

(54) ACQUISITION OF A GATED PILOT BY AVOIDING PARTIAL CORRELATION PEAKS

(75) Inventors: Abhay Joshi, San Diego, CA (US); Serguei A. Glazko, San Diego, CA (US); Arthur James Neufeld, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 13 days.

(21) Appl. No.: 09/895,657

(22) Filed: Jun. 29, 2001

(65) Prior Publication Data

US 2003/0007468 A1 Jan. 9, 2003

(51) Int. Cl.
*H04B 1/69* (2006.01)
(52) U.S. Cl. .................... 375/149; 375/150
(58) Field of Classification Search ........... 375/150, 375/147, 140, 130, 343, 342, 341, 340, 316, 375/149, 142, 145, 148
See application file for complete search history.

(56) References Cited

U.S. PATENT DOCUMENTS

| | | | | |
|---|---|---|---|---|
| 5,577,022 A | * | 11/1996 | Padovani et al. | 370/332 |
| 5,640,414 A | * | 6/1997 | Blakeney et al. | 375/130 |
| 5,821,988 A | * | 10/1998 | Citta et al. | 348/21 |
| 5,859,874 A | * | 1/1999 | Wiedeman et al. | 375/267 |
| 5,889,768 A | * | 3/1999 | Storm et al. | 370/320 |
| 6,154,455 A | * | 11/2000 | Mekkoth et al. | 370/342 |
| 6,195,551 B1 | * | 2/2001 | Kim et al. | 455/436 |
| 6,275,483 B1 | * | 8/2001 | Papasakellariou et al. | 370/335 |

FOREIGN PATENT DOCUMENTS

| | | |
|---|---|---|
| EP | 0718998 | 6/1996 |
| EP | 718998 A2 * | 6/1996 |
| EP | 984563 A2 * | 3/2000 |
| EP | 0984563 | 8/2000 |

* cited by examiner

*Primary Examiner*—Pankaj Kumar
(74) *Attorney, Agent, or Firm*—Philip Wadsworth; Sandra L. Godsey; Albert J. Harnois (57) ABSTRACT

Systems and techniques are disclosed wherein a gated pilot signal can be acquired faster by checking the neighbor pilot signals of the target pilot signal. A subscriber station may frequency lock onto a wrong pilot burst because a partial correlation exists between the wrong pilot burst and an adjacent pilot burst. Comparing the strength of the target pilot signal with the strength of neighbor pilot signals enables the selection of the strongest pilot signal before the timely process of frequency locking and demodulation are initiated. Grouping pilot signals with the same symbol sequence and a pseudo-random noise increment apart enables quick acquisition of a gated pilot signal.

18 Claims, 6 Drawing Sheets

FLOWCHART FOR ACQUISITION ALGORITHM

CONTINUOUS PILOT TRANSMISSION
20

GATED PILOT TRANSMISSION
22

FIG. 1

96 CHIPS
120

928 CHIPS
122

PARTIAL CORRELATION BETWEEN ADJACENT COSETS

FIG. 6

FLOWCHART FOR ACQUISITION ALGORITHM

FIG. 7

ACQUISITION OF A GATED PILOT BY AVOIDING PARTIAL CORRELATION PEAKS

BACKGROUND

1. Field

The present invention relates generally to communications systems, and more specifically, to systems and techniques for acquisition of a gated pilot signal.

2. Background

Modern communications systems are designed to allow multiple users to share a common communications medium. One such communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different pseudo-noise (PN) code that modulates a carrier, and thereby, spreads the spectrum of the signal waveform. The transmitted signals are separated in the receiver by a correlator that uses a corresponding PN code to despread the desired signal's spectrum. The undesired signals, whose PN codes do not match, are not despread in bandwidth and contribute only to noise.

In a CDMA communications system, a subscriber station may access a network, or communicate with other subscriber stations, through one or more base stations. Each base station is configured to serve all subscriber stations in a specific geographic region generally referred to as a cell. In some high traffic applications, the cell may be divided into sectors with a base station serving each sector. Each base station transmits a continuous pilot signal which is used by the subscriber stations for synchronizing with a base station and to provide coherent demodulation of the transmitted signal once the subscriber station is synchronized to the base station. The subscriber station generally establishes a communications channel with the base station having the strongest pilot signal.

Since a continuous pilot signal requires bandwidth that could otherwise be used to transmit information, some recently developed CDMA communications systems have employed gated pilot signals. A gated pilot signal is characterized by a short period of transmission of pilot signal followed by a long period of no transmission. By gating the pilot signal, additional bandwidth can be realized which increases the capacity of the base station. However, synchronizing the subscriber station to the gated pilot signal is relatively more difficult than synchronizing the subscriber station to a continuous pilot signal because in a gated pilot system, the subscriber station may spend considerable resources searching for the pilot signal during periods when none is present.

Gated pilot signals with overlapping pilot bursts in PN space can cause relatively strong partial correlations in adjacent PN offsets. These partial correlation peaks can be falsely assumed as the real PN offsets. A subscriber station may waste significant time in achieving frequency lock with and unsuccessfuly trying to demodulate the control channel from these non-existent PN offsets. Frequency locking and control channel demodulation are the most time consuming steps in the acquisition process and typically take four to eight times more time and resources than the pilot search operation. Hence, these kinds of false alarms can potentially increase the acquisition time by a significant factor. What is needed is a method to significantly reduce the probability of false alarms caused due to partial correlations between adjacent pilot bursts.

SUMMARY

In one aspect of the present invention, a method of acquiring a gated pilot signal includes selecting a strongest pilot peak from a plurality of pilot peaks, evaluating the strength of pilot peaks adjacent to the strongest pilot peak, and selecting a maximum pilot peak from the adjacent pilot peaks and the strongest pilot peak. In a further aspect of the present invention, the adjacent pilot peaks overlap in pseudo-random noise (PN) space the strongest pilot peak. In another aspect, the adjacent pilot peaks overlap in time the strongest pilot peak. In another aspect, the selecting a strongest pilot peak from a plurality of pilot peaks comprises receiving a signal, evaluating the plurality of pilot peaks from the signal, and selecting the strongest pilot peak from the plurality of pilot peaks.

In yet another aspect of the present invention, a computer-readable medium embodying a program of instructions executable by a computer performs a method of acquiring a gated pilot signal, the method including selecting a strongest pilot peak from a plurality of pilot peaks, evaluating the strength of pilot peaks adjacent to the strongest pilot peak, and selecting a maximum pilot peak from the adjacent pilot peaks and the strongest pilot peak.

In a further aspect of the present invention, a receiver includes a searcher configured to search for a plurality of pilot peaks and a processor coupled to the searcher and configured to select a strongest pilot peak from the plurality of pilot peaks, evaluate the strength of pilot peaks adjacent to the strongest pilot peak, and select a maximum pilot peak from the adjacent pilot peaks and the strongest pilot peak.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings where.

DETAILED DESCRIPTION

The detailed description set forth below in connection with the appended drawings is intended as a description of exemplary embodiments of the present invention and is not intended to represent the only embodiments in which the present invention can be practiced. In some instances, the detailed description includes specific details for the purpose of providing a thorough understanding of the present invention. However, it will be apparent to those skilled in the art that the present invention may be practiced without these specific details. In other instances, well known structures and devices are shown in block diagram form in order to avoid obscuring the concepts of the present invention.

Although the various aspects of the present invention are described in the context of a CDMA communications system, those skilled in the art will appreciate that the techniques for acquiring a gated pilot signal described herein are likewise suitable for use in various other communications environment. Accordingly, any reference to a CDMA communications system is intended only to illustrate the inventive aspects of the present invention, with the understanding that such inventive aspects have a wide range of applications.

A subscriber station (also called subscriber unit, mobile station, mobile, remote station, remote terminal, access terminal, and user equipment), may be mobile or stationary, and may communicate with one or more base stations (BSs) (also called base transceiver systems (BTSs), base station transceivers, access points, access nodes, Node B, and modem pool transceivers (MPTs)).

Figure 1:
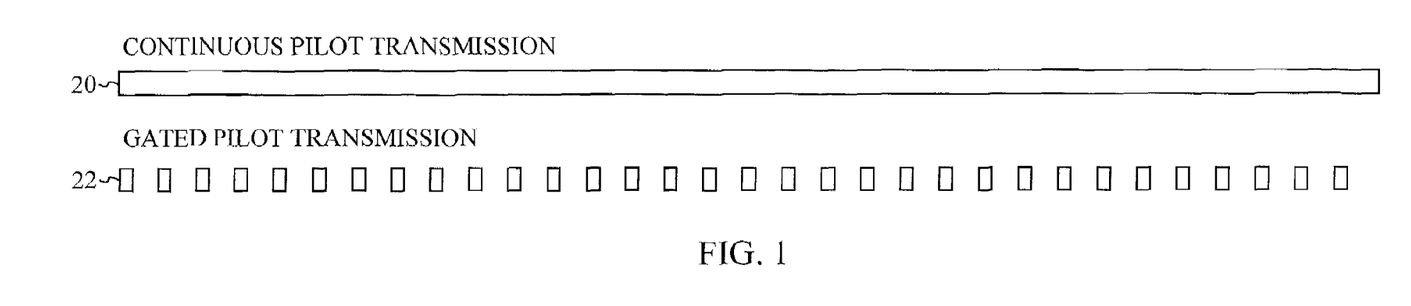
FIG. 1 shows an exemplary continuous pilot transmission and a gated pilot transmission.

FIG. 1 shows an exemplary continuous pilot transmission 20 and a gated pilot transmission 22. The gated pilot signal includes a period of transmission followed by a period of no transmission. Gating the pilot signal enables an increase in bandwidth because the period of no transmission can be used to transmit data.

Figure 2:
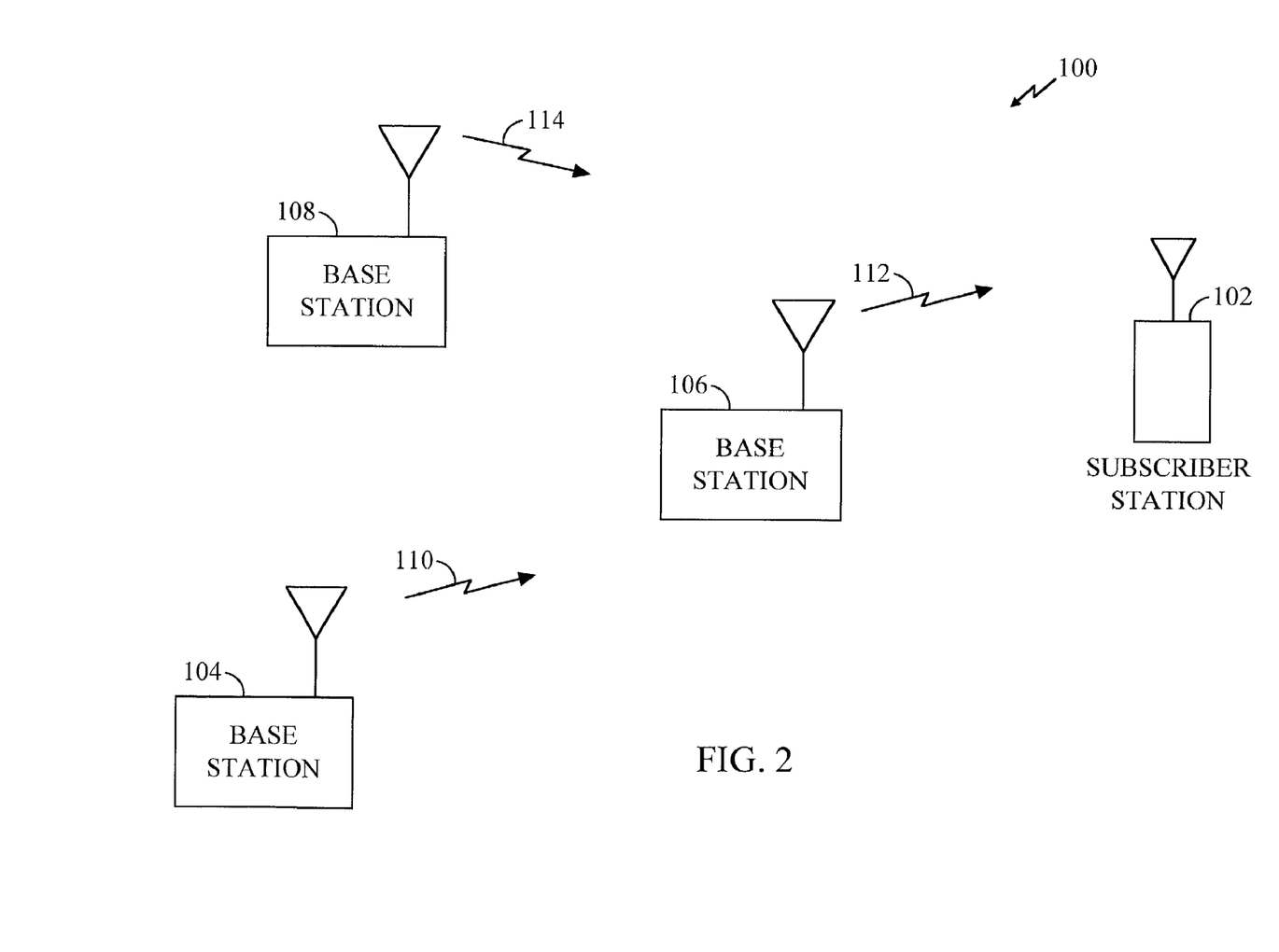
FIG. 2 is a system diagram of an exemplary communications system.

FIG. 2 is a system diagram of an exemplary communications system 100. The communications system provides a mechanism for a subscriber station 102 to access a network, or communicate with other subscriber stations, through one or more base stations. For ease of explanation, only three base stations 104, 106 and 108 are shown. However, as a matter of practice, numerous base stations will be operating with at least one base station located in every cell. Should the cells be divided into sectors, a base station would be located in each sector. In the described exemplary embodiment, each base station 104, 106 and 108 transmits a gated pilot signal 110, 112 and 114, respectively. The gated pilot signal is used by the subscriber station 102 for initial synchronization with a base station and to provide coherent demodulation of the transmitted signal once the subscriber station is synchronized to one of the base stations.

The gated pilot signal contains no data and is generally characterized as an unmodulated spread spectrum signal. The PN code used to spread each gated pilot signal 110, 112 and 114 should, therefore, be different to allow the subscriber station 102 to distinguish between the three base stations 104, 106 and 108. The PN code used to spread each gated pilot signal is known, a priori, by the subscriber station 102, and therefore, each gated pilot signal 110, 112 and 114 can be despread at the subscriber station through a correlation process with a locally generated PN code. A communications channel can then be established with the base station having the strongest gated pilot signal. Given relatively constant environmental conditions, the strongest gated pilot signal is generally transmitted from the base station in the closest proximity to the receiving subscriber station 102, in this case the base station 106.

In an exemplary embodiment of a communications system, acquisition of a gated pilot signal can be achieved by employing a searching methodology that exploits certain characteristics of the gated pilot signal. Pilot search operation consists of correlating the incoming signal with pre-stored Pilot PN sequences and looking for strong correlation peaks. Once a strong peak is found and is verified to be in a coset, the subscriber station tries to achieve frequency lock with the base station that is transmitting the peak. After the frequency lock is achieved, the subscriber station demodulates a control channel to get the timing information about the base station transmitting the pilot. The subscriber station then adjusts its own timing to synchronize itself with the base station.

Although not limited in applicability, the searching methodology is particularly adaptable to CDMA communications systems. In CDMA communications systems, the gated pilot signal transmitted by each base station generally has the same PN code but with a different phase offset. The use of the same PN code is advantageous because it allows a subscriber station to access a base station with a search through a single PN code sequence for all phase offsets. The phase offset allows the gated pilot signals for each base station to be distinguished from one another.

The gated pilot signal transmitted by each base station is contained in a pilot channel of a forward link waveform. The forward link refers to transmissions from a base station to a subscriber station. The forward link waveform may take on various forms without departing from the inventive concepts described throughout. By way of example, the very nature of a gated pilot signal implies that the forward link channel structure, in its simplest form, includes at least one channel which is time-division multiplexed with the pilot channel. In the described exemplary embodiment, the pilot channel is time-division multiplexed with a traffic channel. The resulting forward link waveform is spread with a PN code, modulated onto a carrier waveform, amplified and transmitted into its respective cell or sector by a base station.

More complex forward link channel structures are also contemplated. By way of example, the traffic channel can be parsed into multiple code channels by spreading each traffic channel with an inner orthogonal code generated by using Walsh functions. Alternatively, the pilot channel can be spread with a Walsh cover, and additional code and time channels can be added to include a synchronization channel, paging channels, and traffic channels.

System 100 maybe designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA/IS-856 cdma2000 High Rate Packet Data Air Interface Specification" (hereinafter IS-856), (3) the documents offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (4) the documents offered by a consortium named "3rd Generation Partnership Project 2" (3GPP2) and embodied in a set of documents including Document Nos. C.S0002-A, C.S0005-A, C.S0010-A, C.S0011-A. C.S0024, C.S0026, C.P9011, and C.P9012 (the cdma2000 standard). In the case of the 3GPP and 3GPP2 documents, these are converted by standards bodies worldwide (e.g., TIA, ETSI, ARIB, TTA, and CWTS) into regional standards and have been converted into international standards by the International Telecommunications Union (ITU). These standards are incorporated herein by reference.

Figure 3:
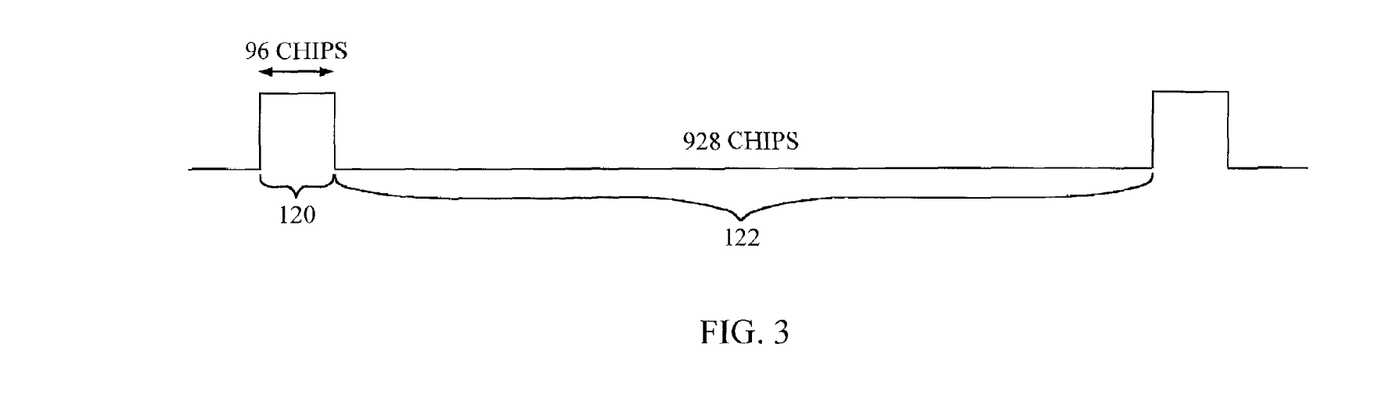
FIG. 3 shows an exemplary gated pilot signal.

In an exemplary embodiment, the communication system 100 has a gated pilot signal with a period of 1024 chips. The gated pilot signal includes a period of transmission for 96 chips followed by a period of no transmission for 928 chips as shown in FIG. 3.

In CDMA based communication systems, the base stations are separated in PN space by integer multiples of a PN increment where one PN increment is 64 PN chips. IS-856 specifies a minimum PN separation between two base station PN offsets to be one PN increment, i.e., 64 chips.

In CDMA communication systems, the PN code is periodic and typically chosen to be $2^{15}$ (32,768) chips per period with 512 PN phase offsets spaced apart by 64 chips. Thus, the PN space comprises $2^{15}$ (32,768) possible PN positions, which results in a total of 512 ($2^{15}/64$) distinct PN phase offsets possible for a base station. As the gated pilot period is 1024 chips in an exemplary embodiment, a PN circle has a total of 32 pilot bursts ($2^{15}/1024$). Thus, the pilot signal is spread by the PN code and transmitted in 32 pilot signal bursts per period.

Figure 4:
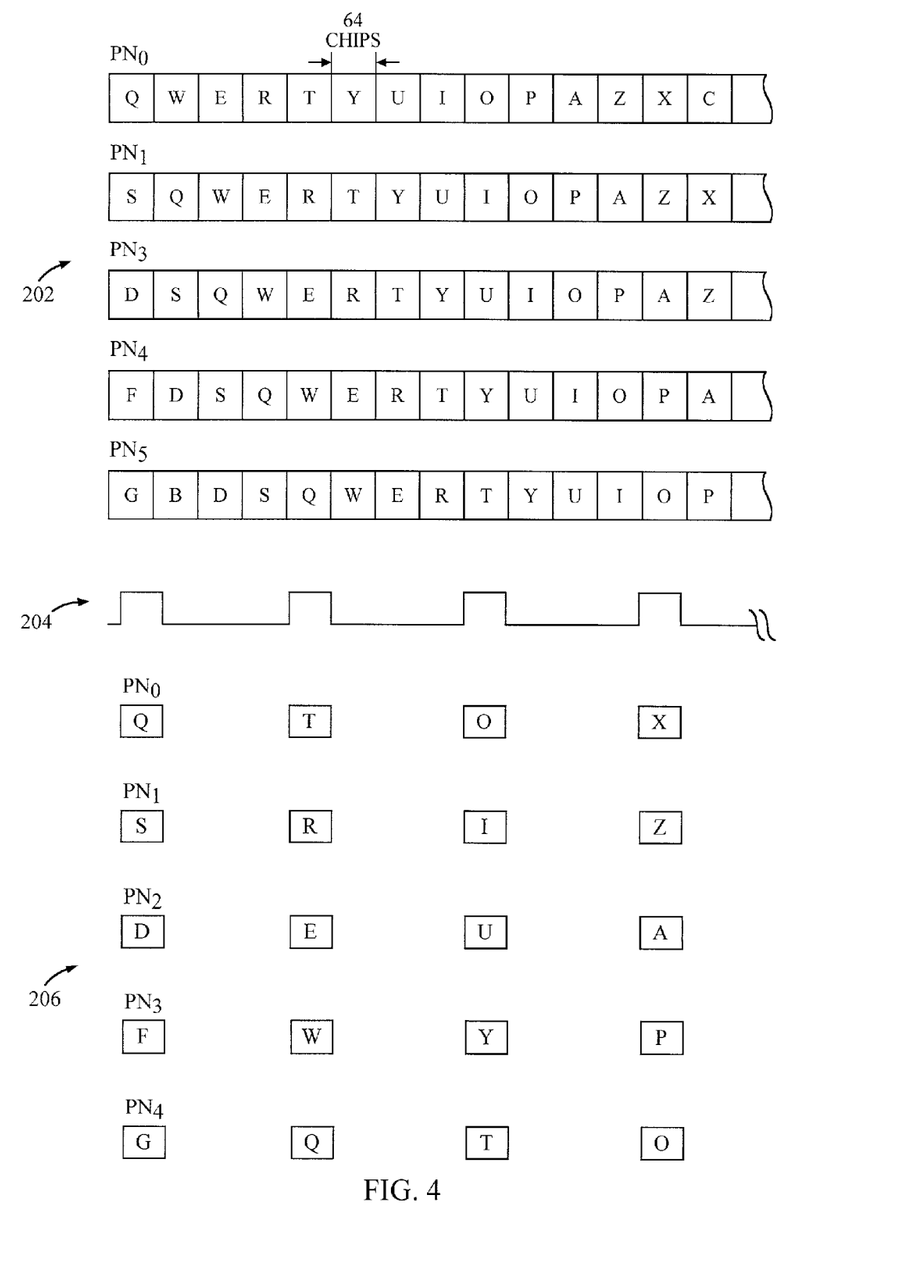
FIG. 4 is a timing diagram showing PN code sequences for several exemplary base stations operating in a CDMA communications system.

A continuous pilot signal is a repeating series of symbols as shown by "PN 0," "PN 1," "PN 2," "PN 3," and "PN 4" in FIG. 4. FIG. 4 is a timing diagram for an exemplary communications system showing five PN codes 202 each being 32,768 chips long. For ease of explanation, the term "symbol" will be used as a shorthand convention for identifying a 64-chip PN code sequence with the understanding that the gated pilot signal contains no data. Using this convention, the 32,768-chip PN code can be represented by a 512 symbol sequence.

In the following example, a system having only 64 distinct PN phase offsets is assumed. Each PN code includes the same symbol sequence but offset in phase. By way of example, PN0 is offset by one symbol from PN1. Similarly, PN1 is offset by one symbol from PN2, PN2 is offset by one symbol from PN3, and PN3 is offset by one symbol from PN4. Neighboring base stations would transmit the same pilot signal, but starting at a different offset in the sequence, as shown by "PN 1" through "PN 4". Since there are 64 symbols in this example, there would be a maximum of 64 distinct PN offsets, 0 through 63.

Each PN code is used to spread a pilot signal. A gating function 204 is then applied to each spread spectrum pilot signal 202. For purposes of illustration, the gating function will be defined as a gate having a one-symbol width and a four-symbol period. As a result of this gating function 204, four different symbol sequences 206 are generated PN 0, PN1, PN 2, and PN 3. The same symbol sequence is generated every fourth PN code phase offset as shown by PN0 and PN4. All gated pilot signals having the same symbol sequence, regardless of phase shift, can be grouped together into sets known as a coset as follows:

Coset0: PN 0, PN4, PN 8, . . . PN 508
Coset1: PN1, PN 3 PN 9, . . . PN 509
Coset2: PN 2, PN6, PN 10, . . . PN 510
Coset3: PN 3, PN7, PN11, . . . PN 511 where the number of cosets can be defined as the number of PN code phase offsets divided by the number of pilot signal bursts per period. When searching for the pilot signal bursts from one coset, the pilot signal bursts from the other cosets will not be seen.

In other communications systems, the length of the PN code for spreading the pilot signal may vary depending on a variety of factors. A short PN code facilitates faster acquisition time whereas a long PN code increases code processing gain. Those skilled in the art will be readily able to assess the performance tradeoffs to determine the optimal length for the PN code. In addition, the number of phase offsets, spacings, and pilot bursts per period can be varied to optimize system parameters.

In an exemplary embodiment, pilots, which are separated by multiples of the gated pilot period, such as every 16 (1024/64) PN offsets, will appear to have identical pilot bursts, although shifted in time. Table 1 shows all the possible 512 PN offsets divided into 16 different cosets.

TABLE 1

| PN offsets divided into Cosets | |
|---|---|
| Coset # | PN Offsets |
| Coset 0 | 0, 16, 32, 48, 64, . . . 496 |
| Coset 1 | 1, 17, 33, 49, 65, . . . 497 |
| Coset 2 | 2, 18, 34, 50, 66, . . . 498 |
| Coset 3 | 3, 19, 35, 51, 67, . . . 499 |
| . . . | . . . |
| Coset 15 | 15, 31, 47, 63, 79, . . . 523 |

To have a larger separation in the PN space for adjacent base stations, it is likely that the network operators would prefer using higher PN increments to lower PN increments. Some CDMA network operators that prefer using a PN increment of four for most networks may occasionally switch to a PN increment of two or one for densely populated networks. Thus, searching cosets in decreasing order of PN increment may result in a reduction in acquisition time.

In an exemplary embodiment, four cosets are gathered into one group, thus dividing the 16 cosets as shown in Table 1 into four different coset groups as shown in Table 2, where for CN, N is a variable that denotes the coset number.

TABLE 2

| Coset Groups | |
|---|---|
| Coset Group 0 | C0, C4, C8, C12 |
| Coset Group 1 | C2, C6, C10, C14 |
| Coset Group 2 | C3, C7, C11, C15 |
| Coset Group 3 | C1, C5, C9, C13 |

Coset Group 0 (CG0) contains offsets for PN increments which are an integer multiple of four. CG1 contains offsets for PN increments which are an integer multiples of two excluding entries from CG0. CG2 and CG3 contain the remaining odd PN offsets. To enhance the probability of early detection of the pilot signal, a subscriber station can search the cosets in the order CG0, CG1, CG2 and CG3.

If the gated pilot burst length is 96 chips and the minimum PN increment supported is 64 chips as in an IS-856 communication network, then there will be a 32 chip pilot burst overlap between pilots operating on adjacent PN offsets and hence, in some cases, adjacent cosets. This 32 chip overlap results in partial correlation energies while searching cosets adjacent to the one where the pilot signal is being transmitted. The partial correlation energies could be of the order of one third the auto-correlation energy of the pilot signal.

Figure 5:
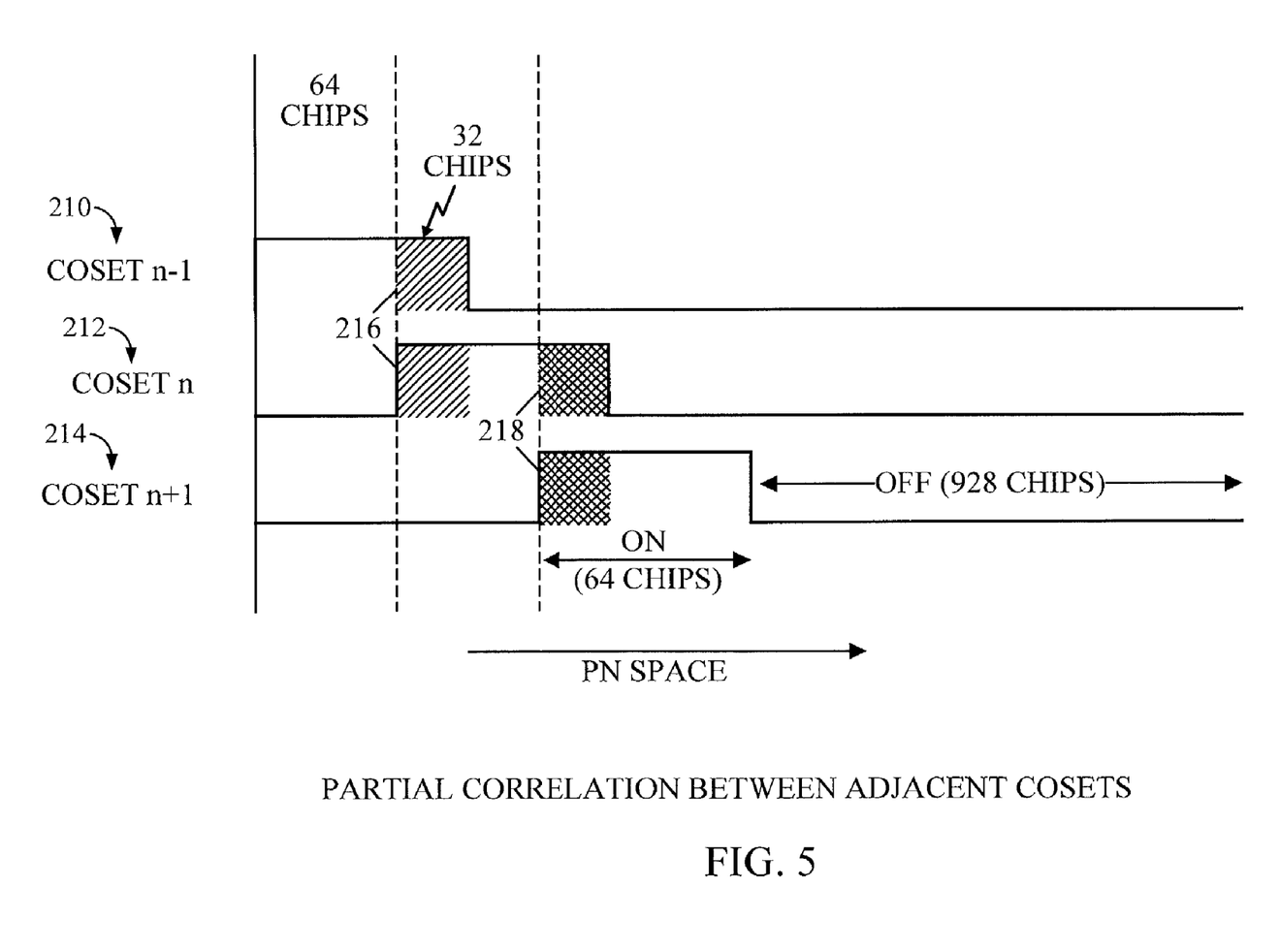
FIG. 5 shows the overlap between adjacent cosets.

If the base station is transmitting the pilot signal at a PN offset in coset n only and there is no other PN offset transmitting the pilot, then the subscriber station searches cosets sequentially and it will find one third partial correlation energy while searching for the pilot in coset n−1 and in coset n+1, whereas the actual signal is being transmitted in cosetn. FIG. 5 shows the overlap between adjacent cosets. There are three cosets: coset n 210, coset n−1 212, and coset n+1 214. There is a 32-chip overlap 216 between coset n−1 210 and coset n 212 and a 32-chip overlap 218 between coset n 212 and coset n+1 214. In should be understood that the X-axis in FIG. 5 is the PN space and not time. The pilot bursts shown in FIG. 5 are transmitted at the same time, but are shifted by 64 chips in the PN space.

The partial correlation energy peaks may be relatively strong if the base station transmitting on coset-n has favorable signal conditions. These strong partial correlation peaks may cause the subscriber station to falsely assume that coset n−1 contains the real pilot signal. Then, the subscriber station will successfully lock its frequency with the coset n−1 peak and will try to demodulate the signaling channel from the pilot in coset n−1. However, the subscriber station will not be able to demodulate the signaling information successfully because there is no base station transmitting on the control channel at PN offset in coset n−1. Then, the subscriber station will declare synchronization failure and may begin searching the next candidate coset.

This problem is exacerbated if the cosets are not searched in incrementing or decrementing order. If the cosets are not searched in incrementing or decrementing order, then coset n+1 and coset n−1 may be searched before coset n, which may result in two occurrences of unsuccessful control channel demodulations on each partial correlation peak before the real pilot peak is found on coset n. For example, coset-4 (CG0) and coset-6 (CG2), which are adjacent to coset-5 (CG3), may be searched before coset-5.

Figure 6:
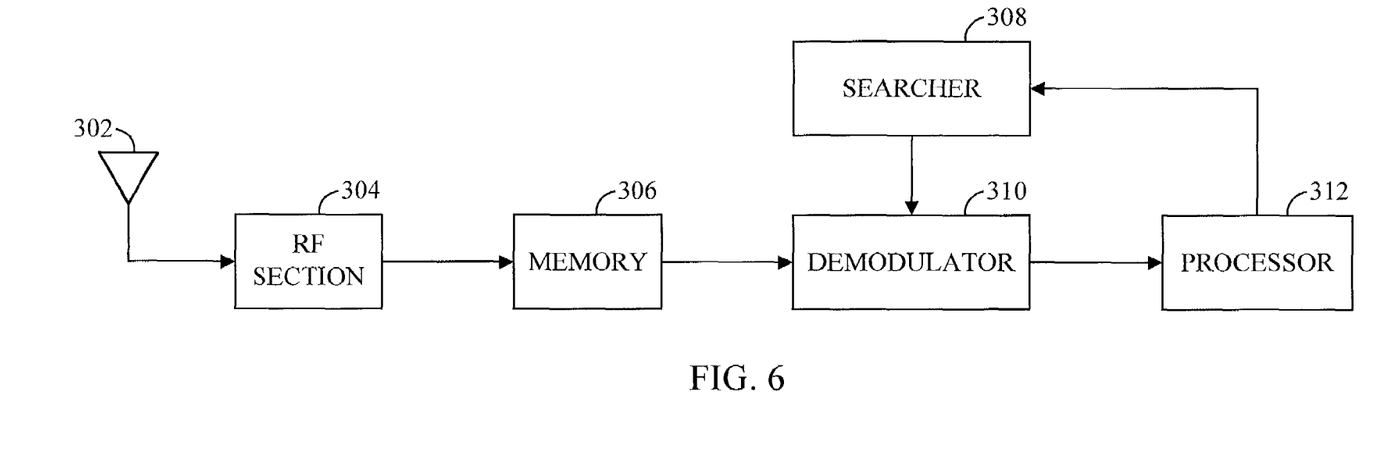
FIG. 6 is a block diagram of an exemplary receiver in a CDMA communications system.

FIG. 6 is a block diagram of an exemplary receiver in a subscriber station operating in a CDMA communications system. In the described exemplary embodiment, the signal transmissions from all the base stations are received through one or more antennas 302. The resulting superimposed signal received by the antenna 302 is provided to an RF section 304. The RF section 304 filters and amplifies the signal, downconverts the signal to baseband, and digitizes the baseband signal. The digital samples are provided to memory 306 for the purposes of acquisition. The memory 306 stores the number of chips equal to or greater than the period of the pilot signal burst. This approach should result in at least one gated pilot burst from each base station being captured in memory 306. An HDR communications system with 32 pilot signal bursts over a PN code sequence of 32,768 chips has a pilot signal burst period equal to 1024 chips.

The acquisition process involves searching through the digital samples stored in memory to find all the pilot signal bursts for one coset. This can be achieved by correlating the digital samples stored in memory with a locally generated PN code sequence. By way of example, a searcher 308 generates a symbol, i.e., a 64 chip PN code sequence, common to the gated pilot signals from each base station in the same coset. The symbol from the searcher 308 is coupled to a demodulator 310 where it is correlated with the digital samples stored in memory 306. The searcher 308 sequentially shifts the symbol in phase as part of a systematic search through the digital samples to find a corresponding symbol in memory 306.

The demodulator 310 can be implemented in a variety of fashions. By way of example, in CDMA communications systems, or any other type of communications system, which uses diversity techniques to combat fading, a RAKE receiver may be used. The RAKE receiver in a CDMA communications system typically utilizes independent fading of resolvable multipaths to achieve diversity gain. Specifically, the RAKE receiver can be configured to process one or more multipaths of the gated pilot signal. Each multipath signal is fed into a separate finger processor to perform PN code despreading with the locally generated PN code from the searcher 308. Walsh code decovering may also be provided by the RAKE receiver if needed. The RAKE receiver then combines the output from each finger processor to recover the gated pilot signal.

The output of the demodulator 310 is provided to a processor 312. The processor 312 is coupled to the searcher 308 and implements an acquisition algorithm to select the base station having the strongest pilot signal. The acquisition algorithm searches for N strongest peaks and selects the strongest peak. Once the strongest peak is selected, the algorithm searches the neighbors of the strongest peak to determine whether one of the neighbor peaks is stronger.

Figure 7:
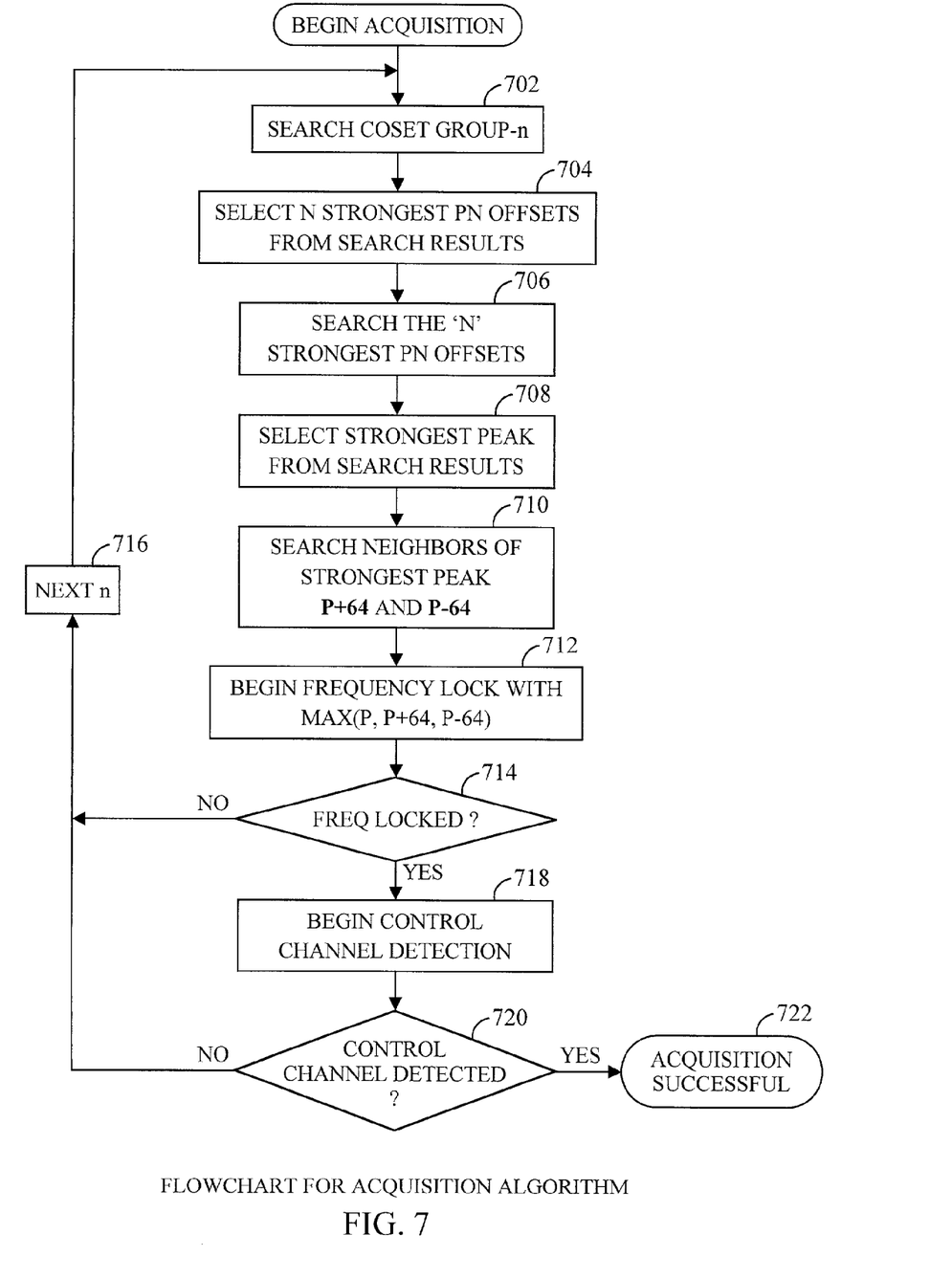
FIG. 7 is a flow chart illustrating an exemplary algorithm performed by a processor in a CDMA receiver.

An exemplary acquisition algorithm implemented by the processor is illustrated by the flow chart of FIG. 7. Once the subscriber station verifies a strongest peak at PN offset P such that P can be used for frequency lock, the subscriber station searches the adjacent two cosets to the coset in which peak P was found. The subscriber station sends two additional searches each targeted at +64 chips, −1 PN offset, and −64 chips, +1 PN offset, respectively from the position of the strongest peak. These searches are called partial correlation searches. These partial correlation searches may be performed on the same set of input data, which was used for searching the main peak P.

In step 702, the processor searches coset group n. The value n is an integer and then can be initialized to any valid value. Once n reaches its upper limit, it is set to the lower limit and is incremented each cycle of the acquisition algorithm. Each PN offset peak of each coset in coset group n is evaluated. In step 704, the processor selects the N (where N is an integer) strongest PN offset peaks from the search. In step 706, the processor searches and evaluates the N strongest PN offsets again, and in step 708, the processor selects the strongest peak from the N strongest PN offsets. In step 710, the processor searches the neighbors of the selected strongest PN offset peak. If P, P+64 and P−64 are the three peaks obtained from the search results, then in step 712, the subscriber station selects the maximum of three peaks, MAX(P, P+64, P−64), and uses it for achieving the frequency lock and control channel detection. As the correlation peaks are about one third in energy as compared to the main peak, the MAX( ) function ensures that the subscriber station will never select a partial correlation peak for frequency lock operation. This reduces the probability of false alarm in selecting a pilot energy peak, which directly translates into a decrease in overall system acquisition time for the subscriber station.

In step 714, the demodulator will attempt to lock to the carrier. If the demodulator is unable to lock to the carrier frequency, then the search for a gated pilot burst signal has failed. As a result, then, the processor proceeds to the next coset group in step 716 to repeat the search process.

If the demodulator successfully locks to the carrier frequency, the processor begins control channel detection in step 718. In step 720, the demodulator checks whether a control channel is detected. If a control channel is not detected, then the processor proceeds to the next coset group in step 716. If a control channel is detected, then in step 722, the acquisition process is complete and a communications channel can now be established with the base station.

Although the exemplary processor algorithm described in connection with FIG. 7 includes various sequential steps, those skilled in the art will appreciate that the sequence of steps may be altered to optimize processor resources, or alternatively, one or more steps may be processed in parallel. Moreover, one or more steps could be omitted, or additional steps known in the art could be used, either alone or in combination with one or more of the described algorithmic steps set forth in FIG. 7.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of acquiring a gated pilot signal, comprising:
    searching at least a first coset of pseudo-random noise (PN) offset peaks;
    selecting N strongest PN offset peaks from at least the first coset;
    selecting a strongest pilot peak from the N strongest PN offset peaks from the at least first coset;
    evaluating a strength of pilot peaks adjacent to the strongest pilot peak selected;
    selecting a maximum pilot peak from the adjacent pilot peaks and the strongest pilot peak;
    initiating a frequency lock with the selected maximum pilot peak; and
    determining whether the initiated frequency lock is successful.

2. The method of claim 1 further comprising:
    detecting a control channel providing that the frequency lock with the maximum pilot peak was successful.

3. The method of claim 1, further comprising: searching at least a second coset of pseudo-random noise (PN) offset peaks providing that the frequency lock with the maximum pilot peak was not successful.

4. The method of claim 1, wherein the adjacent pilot peaks overlap the strongest pilot peak in PN space.

5. An apparatus, comprising:
    means for searching at least a first coset of pseudo-random noise (PN) offset peaks;
    means for selecting N strongest PN offset peaks from at least the first coset;
    means for selecting a strongest pilot peak from the N strongest PN offset peaks from the at least first coset;
    means for evaluating a strength of pilot peaks adjacent to the strongest pilot peak selected;
    means for selecting a maximum pilot peak from the adjacent pilot peaks and the strongest pilot peak;
    means for initiating a frequency lock with the selected maximum pilot peak; and
    means for determining whether the initiated frequency lock is successful.

6. The apparatus of claim 5, further comprising:
    means for detecting a control channel providing that the frequency lock with the maximum pilot peak was successful.

7. The apparatus of claim 5, further comprising:
    means for searching at least a second coset of pseudo-random noise (PN) offset peaks providing that the frequency lock with the maximum pilot peak was not successful.

8. The apparatus of claim 5 wherein the adjacent pilot peaks overlap the strongest pilot peak in PN space.

9. An apparatus, comprising:
    a memory, adapted to store digital samples representing at least one gated pilot burst from each base station;
    a searcher adapted to generate at least one symbol;
    a demodulator operably connected to said memory, adapted to correlate said at least one symbol with said digital samples stored in memory;
    a processor coupled to said searcher and operably connected to said demodulator, adapted to search at least a first coset of pseudo-random noise (PN) offset peaks, select N strongest PN offset peaks from at least the first coset, select a strongest pilot peak from the N strongest PN offset peaks from the at least first coset, evaluate a strength of pilot peaks adjacent to the strongest pilot peak selected; and select a maximum pilot peak from the adjacent pilot peaks and the strongest pilot peak; initiate a frequency lock with the selected maximum pilot peak; and determine whether the initiated frequency lock is successful.

10. The apparatus according to claim 9, wherein said demodulator is a RAKE receiver.

11. The apparatus of claim 9, wherein said processor is further adapted to detect a control channel providing that the frequency lock with the maximum pilot peak was successful.

12. The apparatus of claim 9, wherein said processor is further adapted to search at least a second coset of pseudorandom noise (PN) offset peaks providing that the frequency lock with the maximum pilot peak was not successful.

13. The apparatus of claim 9, wherein the adjacent pilot peaks overlap the strongest pilot peak in PN space.

14. The apparatus of claim 9, further comprising:
    an antenna adapted to receive signal transmissions; and
    an RF section operably connected to said antenna and said memory, adapted to filter, amplify, downconvert and digitize said received signal transmissions.

15. The apparatus according to claim 14, wherein said demodulator is a RAKE receiver.

16. The apparatus of claim 14, wherein said processor is further adapted to detect a control channel providing that the frequency lock with the maximum pilot peak was successful.

17. The apparatus of claim 14, wherein said processor is further adapted to search at least a second coset of pseudorandom noise (PN) offset peaks providing that the frequency lock with the maximum pilot peak was not successful.

18. The apparatus of claim 14, wherein the adjacent pilot peaks overlap the strongest pilot peak in PN space.

* * * * *